United States Patent [19]

Salisbury

[11] 4,434,130
[45] Feb. 28, 1984

[54] ELECTRON SPACE CHARGE CHANNELING FOR FOCUSING ION BEAMS

[75] Inventor: Winfield W. Salisbury, Scottsdale, Ariz.

[73] Assignee: Energy Profiles, Inc., Newtown Square, Pa.

[21] Appl. No.: 203,134

[22] Filed: Nov. 3, 1980

[51] Int. Cl.³ .............................................. G21B 1/02
[52] U.S. Cl. .................................. 376/107; 376/126; 376/139
[58] Field of Search ...................... 376/107, 126–130, 376/139–141, 144

[56] References Cited

U.S. PATENT DOCUMENTS

| | | | |
|---|---|---|---|
| 2,920,235 | 1/1960 | Bell et al. | 376/141 |
| 3,005,767 | 10/1961 | Boyer et al. | 376/126 |
| 3,014,857 | 12/1961 | Gow et al. | 376/141 |
| 3,025,429 | 3/1962 | Gow et al. | 376/126 |
| 3,036,963 | 5/1962 | Christofilos | 376/126 |
| 3,039,014 | 6/1962 | Chang | 376/126 |
| 3,071,525 | 1/1963 | Christofilos | 376/126 |
| 3,096,269 | 7/1963 | Halbach et al. | 376/107 |
| 3,326,769 | 6/1967 | Neidigh et al. | 376/126 |
| 3,527,977 | 9/1970 | Ruark | 376/141 |
| 3,626,305 | 12/1971 | Furth et al. | 376/126 |
| 3,634,704 | 1/1972 | Stix | 376/126 |
| 3,664,921 | 5/1972 | Christofilos | 376/126 |
| 4,172,008 | 10/1979 | Fleet | 376/126 |

OTHER PUBLICATIONS

"Controlled Thermonuclear Reactions," D. Van Nostrand Co., Inc., Princeton, N.J., Glasstone et al., 1960, pp. 71–78.

Primary Examiner—Harvey E. Behrend
Attorney, Agent, or Firm—Richards, Harris & Medlock

[57] ABSTRACT

A fusion reaction system wherein a compressed spiral beam of electrons forms a cylindrical electron sheath and wherein oppositely directed cylindrical beams of fusible ions are projected through said electron sheath and are forced into a common thin cylindrical path located where the potential gradient in electron sheath is minimum.

16 Claims, 6 Drawing Figures

ELECTRON SPACE CHARGE CHANNELING FOR FOCUSING ION BEAMS

TECHNICAL FIELD

This invention relates to the generation of energy from fusions of atomic nuclei which are caused to travel towards each other along collision courses through a compressed sheath of spiraling electrons.

BACKGROUND ART

It is known that individual nuclear particles are so constituted as to permit fusing of the lighter nuclei. Fusion of light nuclei is accompanied by release of energy. Of particular interest is any fusion reaction in which power can be produced in quantities greater than the power consumed in establishing and maintaining the reaction. There are over 30 reactions now known to be possible. The most appealing reactions are those which involve the heavy hydrogen isotopes, deuterium and tritium, because they tend to have the largest fusion reaction cross section at the lowest energies. Many possible reactions are well known. For example, *Van Nostrand's Scientific Encyclopedia*, Fifth Edition, Reinhold Company, New York, N.Y., 1976, at page 1656, et seq., discusses various possibilities for producing a net gain in power from fusion reactions and briefly describes some of the attempts to perform such reactions with a net power gain.

Plasma research has received and is receiving concentrated attention, but the formidable task of plasma containment has yet to be solved. In avoidance of the problems of containment, a more recent approach involves laser-induced fusion. In its simplest form a focused energetic laser beam is brought to bear on a small deuterium-tritium pellet for heating to fusion temperatures. Efforts on this and on other fronts, such as those involving containment, have been steady in response to high incentives.

Thus, while many of the possibilities have long been known and have been widely attached through various approaches towards achieving net power gain from fusion, the challenge remains unsatisfied.

The obvious advantage of fusion power is that it offers the promise of being able to utilize an essentially inexhaustible low cost fuel supply. This prospect is a growing challenge as world demands for energy continue to increase. A further significant advantage is that optimum fuels may be chosen to produce reaction products which are completely non-toxic and thus permit energy producing operations compatible with the most demanding environmental requirements.

Reactions free of neutron generation can produce energy in a way that is shieldable for personnel protection simply by the presence of structures necessary for carrying out the fusion reaction.

In application of this invention, the individual reactants are combined in such a way that they are not individually self-reactant. This permits definitive choice and execution of neutronless fusion.

DISCLOSURE OF THE INVENTION

The present invention provides a new method and system of atomic fusion for power generation. It is based upon the control of oppositely directed ions by a spiral electron sheath as to promote fusion.

Appropriately high velocity fusible ion beams are directed along head-on collision paths in an annular zone wherein beam compression by electrostatic focusing of a sheath of spiraling electrons forces the ions to follow a path where the potential gradient is minimum.

The invention involves generating two beams of fusible ions which are projected towards each other along cylindrical paths determined by the electrical field produced by a compressed spiral sheath of electrons traversing a cylindrical reaction zone. In one embodiment, a steady radial electric field is imposed on an electron beam to compress the beam and reduce the radius of the spiral paths for enhancing electron density. Ions of one beam travel the same cylindrical zone as ions of the other beam. Energy produced by the nuclear reactions resulting from such collisions is then extracted by means of heat exchange or deceleration processes.

Beam compression to concentrate the electrons is achieved through electrostatic focusing. The electron distribution across the electron sheath will not be uniform and will exhibit a zone minimum gradient which defines the location of the path the ions will be forced to follow. Thus, two independent streams of ions can be propelled in opposite directions in the same space to maximize fusion-producing collisions.

Energy production involving the present invention, through choice of fuels, can be free of hazards of undesirable radiation and avoid the production of toxic wastes that have characterized operations involving fission as practiced. Because of this characteristic of the present invention, it lends itself particularly to reactors of the size of drive systems for automobiles, aircraft or smaller vehicles, as well as satisfying the utility needs for living quarters and for industry.

As will be hereinafter noted, several fusion reactions are known which involve the use of fuels which are plentiful and available throughout the world. The isotope deuterium is plentiful in the sea. Helium-3, boron and lithium are known to be in such supply as to warrant labelling them and deuterium as fuels which are essentially inexhaustible. By directing ions of such fuel at appropriate energies along collision paths, a measure of control is provided in energy production from fusion reactions that has heretofore not appeared possible.

With the foregoing points in mind, embodiments of the invention and unique systems employed for carrying out fusion reactions will now be described.

BRIEF DESCRIPTION OF THE DRAWINGS

A more complete understanding of the invention and its advantages will be apparent from the following detailed description taken in conjunction with the accompanying drawings in which.

DETAILED DESCRIPTION

General

Figure 1:
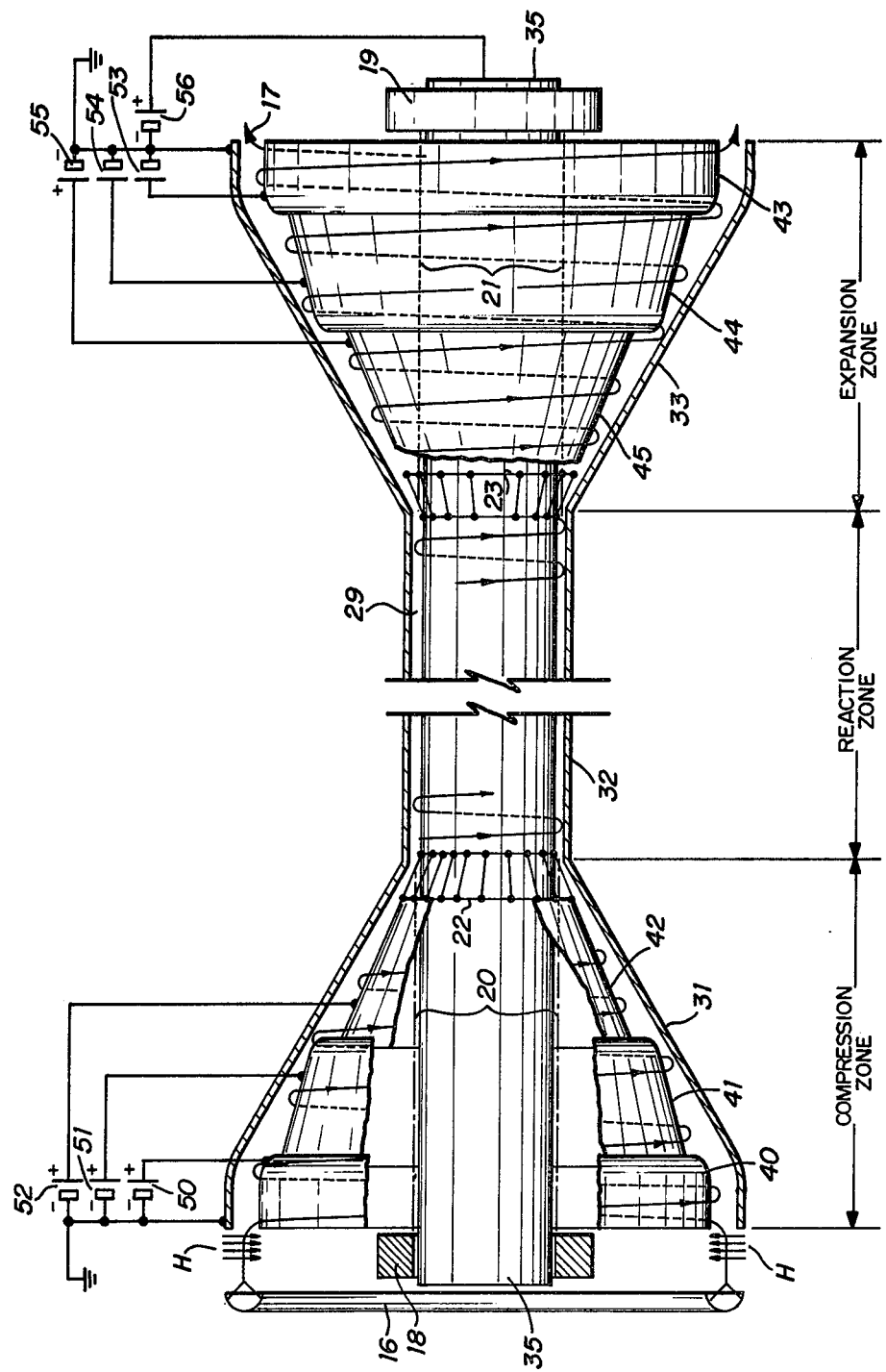
FIG. 1 diagrammatically illustrates the present invention.

FIG. 1 illustrates production of nuclear fusion reactions between two accelerated beams of ions in a suitable high density mode to produce heat energy from a reaction such as the combination of deuterium and helium-3 or protons and boron.

A very high density sheath of electrons rotates in a coaxial system under cylindrical electrostatic focusing. The electron sheath or beam is introduced in cylindrical form through a magnetic field and then is constrained to rotate in a radially compressing electric field so that the centrifugal force of the rotating electrons is balanced against the inward radial force of an electric field. The electron beam is thus directed down a compression ramp where the electric field becomes continually more intense so that the beam is forced to travel in smaller and smaller radii. The charge density that can be contained by this system is inversely proportional to the fourth power of the radius. Therefore, a very dense and thin electron sheath is produced in a small annulus in a coaxial system. The electron sheath has a negative space charge which is most dense on the inside of the sheath. This defines a channel to confine positively charged ions. The amount of positive charge and its mass is such that the mass and charge in the electron channel is not overcome.

Thus, the electron sheath rotates around a central conductor to balance the electron centrifugal force against the inward radial electric field. The space charge of a cylindrical ion beam of positive ions is brought in through a grid for travel along the zone of negative potential minimum created by the electron sheath. This confines the positive ions to a very much smaller cylindrical volume inside the electron sheath than the sheath itself occupies.

From the opposite end of the electron sheath channel, a second ion beam is introduced traveling in the opposite direction and likewise confined. The two ion beams are thus brought together in thin, powerfully confined, shell-like channel under influence of the space charge of the confined electrons. There is provided a long and extremely dense collision space for ions traveling in cylindrical beams in opposite directions.

For example, a cylindrical beam of deuterium ions may travel through one end of the electron negative space charge channel and a similar beam of helium-3 ions may travel from the opposite direction. The two beams meet all along the channel. The channel may be so thin and so confining that the cross section for nuclear reaction is extremely high compared to the particle density in the beams multiplied by the area of the hollow cylinder beams. Thus, the probability of a useful nuclear collision approaches unity, meaning that most of the ions in the two ion beams react to produce the energetic particles resulting from such an interaction. The energy of the electrons and the energy of the ions are independent. The two ion beams can be accelerated so that they meet in their center of mass system with the energy difference which is optimum for a maximum cross section to produce the desired nuclear reaction. The nuclear reaction may be chosen to produce only charged particles which can be collected on the surfaces of the coaxial confining system for the electrons and the heat thereby converted to useful energy. The particles resulting from the nuclear reaction will have so much energy that they easily escape from the coaxial sheath. They are collected by the walls of the coaxial confining system. The electrons exit up a decompression ramp and are collected or put through an inverse magnetic field and collected against a decelerating electric field so as to return their energy to the original electron power supply. Thus, the power necessary to maintain the electron space charged compression region can be extremely small and, in fact, negligible compared to that released by the nuclear reaction.

FIG. 1

Referring to FIG. 1, a source 16 of electrons is mounted at the left end of a reactor unit which is provided with a central conductive mandrel 35 from which there are supported two sets of deflecting electrodes. The first set of deflecting electrodes comprises the electrodes 40, 41 and 42. The second set comprises electrodes 43, 44 and 45. An outer housing has a left-hand conical section housing 31, a central cylindrical section housing 32 and a right-hand conical section housing 33. Potential sources 50, 51 and 52 maintain the electrodes 40, 41 and 42, respectively, at positive potentials relative to the housing 31-33. Similarly, sources of potential 53, 54 and 55 maintain the electrodes 43, 44 and 45, respectively, at potentials positive relative to housing 31-33. A source 56 maintains the central mandrel 35 at a predetermined positive potential relative to housing 31-33. It will be noted that electrodes 40-42 and 45 have been partially broken away.

A magnet, now shown, is provided to produce a magnetic field H at the output of the electron source 16.

Ion sources 18 and 19 are provided at opposite ends of the central mandrel 35. Ion sources 18 and 19 are ring shaped and preferably continuous to provide cylindrical beams 20 and 21 of oppositely directed ions. The ions from source 18 may comprise deuterium ions. The ions from source 19 may comprise helium-3 ions. The cylindrical beams 20 and 21 pass through grids 22 and 23 that are located at the confronting portions of electrodes 42 and 45. Grids 22 and 23 provide passageways through which beams 20 and 21 may enter into an elongated cylindrical reaction zone 29.

Electrons from source 16 are first forced into a spiral orbit. The stream of electrons is then compressed in the compression zone for entry into and travel through the reaction zone and then out from the system through the expansion zone and exit port 17.

The ions in beams 20 and 21 pass through grids 22 and 23 and then travel towards each other in the reaction zone 29. They are forced by reason of the potential gradient in the spiraling electron sheath to occupy the same cylindrical paths. The ions in beams 20 and 21 travel straight line paths, but because the sources 18 and 19 are continuous ring sources, the ions in paths 20 and 21 form essentially cylindrical beams. Collisions between ions from the paths 20 and 21 in the reaction zone 29 bring about the release of energy from the fusion reaction.

If the ions from source 18 are deuterium ions and ions from the source 19 are helium-3 ions, then the following well known reaction takes place:

$$^2D + {}^3He \rightarrow {}^4He + p + 18.3 \text{ MeV} \qquad (1)$$

Two particles result, i.e., a helium atom and a proton, plus 18.3 MeV of energy. The particles at such energy no longer are confined by the field and, thus, may esward ring 10 with the end thereof inside the small end of electrode 41. Electrode 41 extends toward ring 10 with the end thereof inside the end of electrode 40. In a similar manner, electrodes 43, 44 and 45 are mounted in the compression zone.

Ion sources 18 and 19 are mounted at opposite ends of mandrel 35 inside the evacuated zone for providing oppositely traveling ion beams 20 and 21.

The inner wall of the cylindrical housing section 32 is provided with a lining 100 of carbon, preferably pyrolitic carbon. The outer surface of the cylindrical housing 35 is provided with a like lining 101 of pyrolitic carbon.

A cylindrical heat exchange jacket 102 surrounds the cylindrical housing section 32 and is provided with a fluid inlet 103 and a fluid outlet 104. A heat exchange jacket 105 inside the mandrel 35 spans its reaction zone and is provided with an inlet channel 106 and an outlet channel 107. Jackets 102 and 105 are flow connected to a utilization unit 108.

Figure 3:
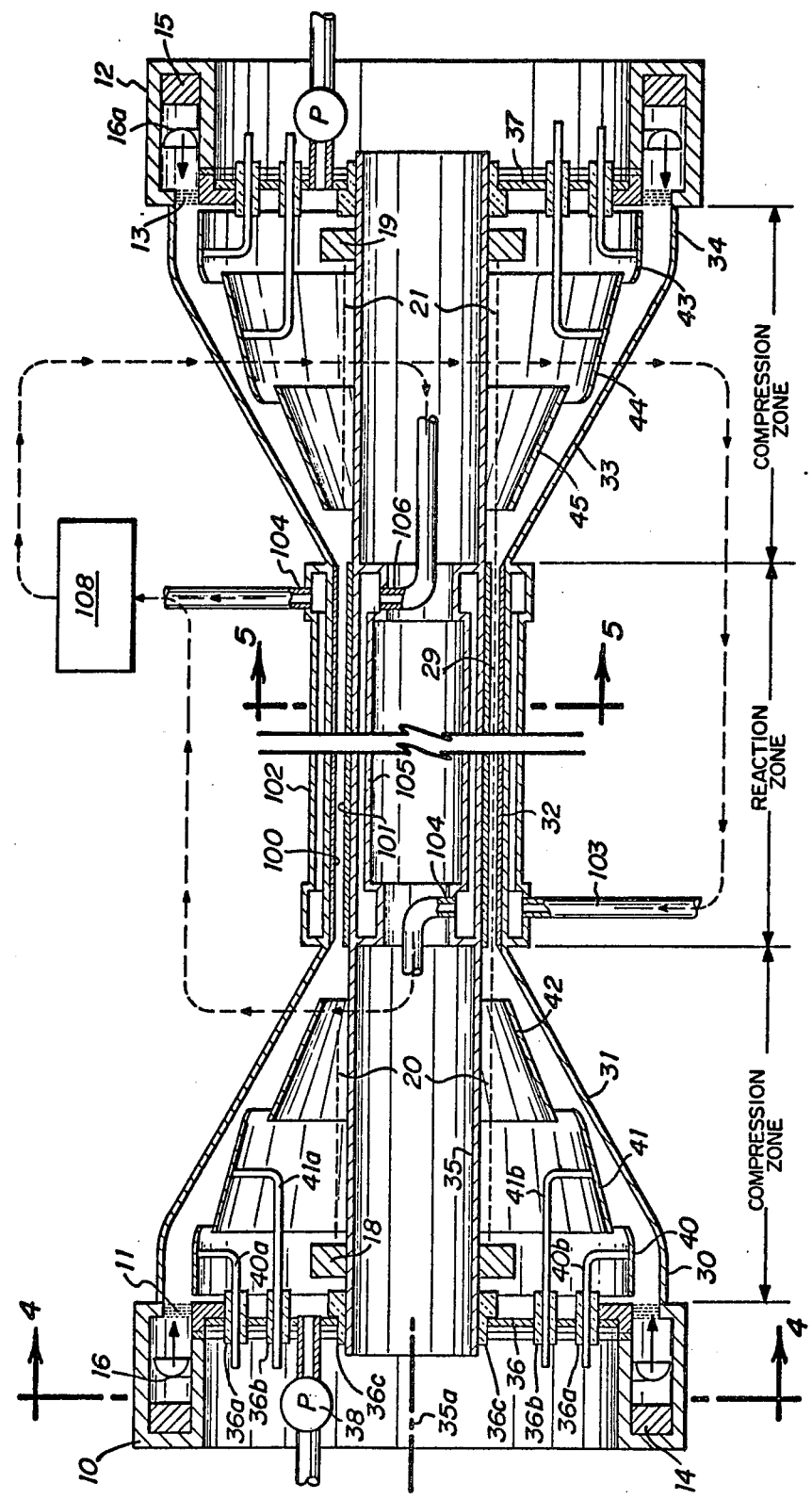
FIG. 3 is a more detailed sectional view of the reactor of FIG. 1.

As shown in FIG. 3, the electrode 40 is positioned near the end of ring 10 adjacent gap 11 and is supported by electrically conductive rods 40a and 40b, which extend through closure plate 36 by way of insulators 36a. Four supporting rods are employed for electrode 40, only two, rods 40a and 40b, being shown in FIG. 3. Similarly, electrode 41 is supported by rods 41a, 41b which also pass through insulators in plate 36. The end of mandrel 35 is secured to plate 36 by way of insulators 36c.

Figure 4:
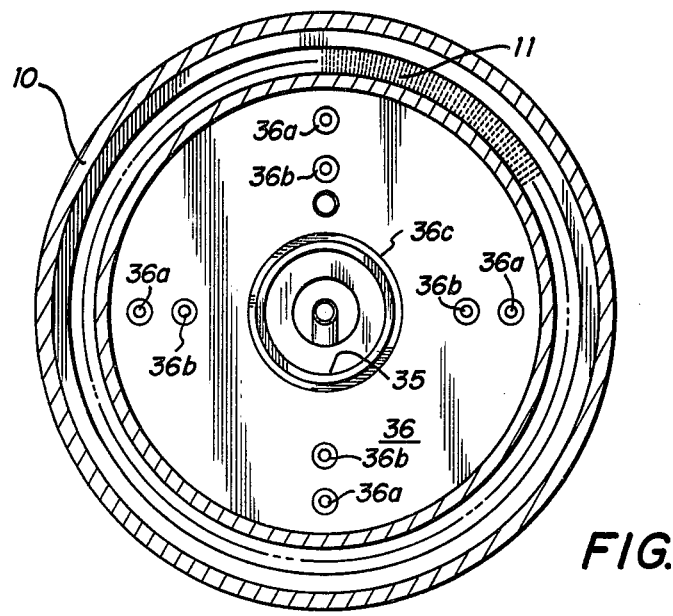
FIG. 4 is a sectional view taken along lines 4—4 of FIG. 3.

In FIG. 4, the ring 10 is shown in sectional view. Plate 36 is of disc or washer shape and with the electrodes 40a–40d, 41a–41d, and the end of mandrel 35 extending therethrough. While only one flow channel has been illustrated leading to the vacuum pump 38 of FIG. 2 it will be apparent that a manifold may be provided leading from several passages through end plate 36 to facilitate evacuation.

The supporting rods 40a–40d and 41a–41d, as well as the central mandrel 35, provide for the application of DC voltages to the electrodes 40, 41 and 42 in order to force electrons from source 16 to follow a spiral path of progressively decreasing radius until they enter the cylindrical reaction zone 29.

Figure 5:
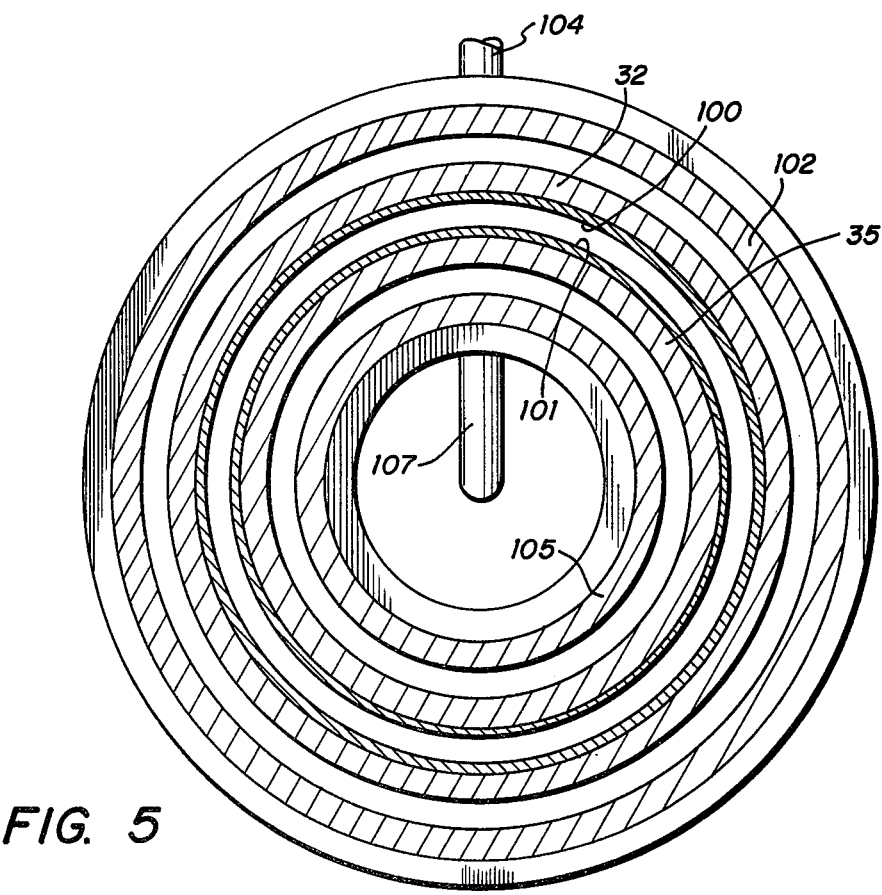
FIG. 5 is a sectional view taken along lines 5—5 of FIG. 3.

FIG. 5 is an enlarged sectional view of the reaction zone 29. The inner mandrel 35 supports the internal heat exchange jacket 105 around which a flow of suitable heat exchange fluid is established during operation of the system. The outer wall of mandrel 35 is coated with the pyrolitic carbon lining 101 for absorbing the energy of the particles produced in connection with fusion reactions in the reaction zone 29. Similarly, the housing 32 extending through the reaction zone has an internal coat of pyrolitic carbon lining 100 for absorption of energy of the reaction products. Heat exchange jacket 102 encircles housing 32 in coaxial spaced relation for flow therethrough of suitable cooling fluid.

FIG. 6

Figure 6:
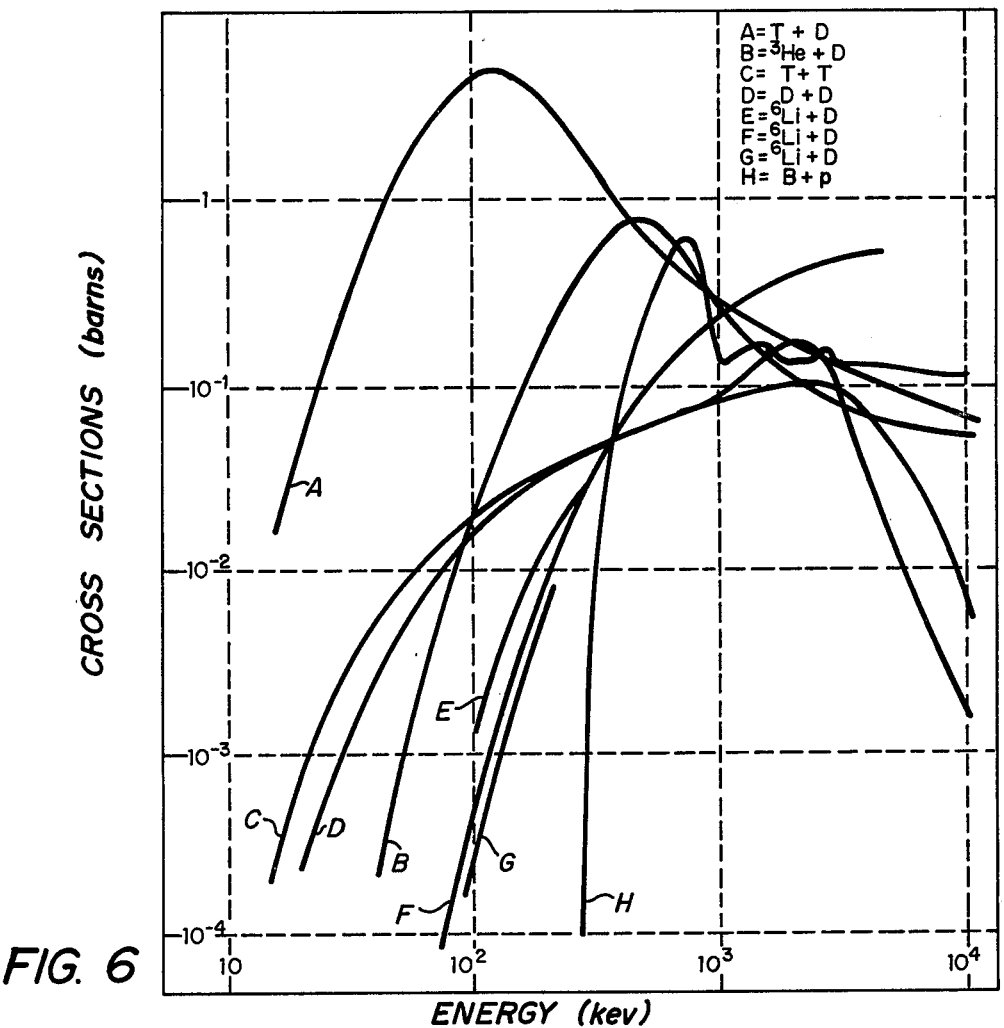
FIG. 6 illustrates cross sections for several fusion reactions.

FIG. 6 illustrates cross sections for several fusion reactions. Particle energy, in electron volts, is plotted on the ordinates. The reaction cross section, in barns, is plotted along the abscissa where each barn is $10^{-24}$ cm$^2$.

FIG. 6 indicates that fusion of deuterium and tritium is probably the easiest reaction to manage. More particularly, nuclei at 20 KeV of deuterium and tritium have, from FIG. 6, curve A, a fusion cross section of about 0.1 barn. Particles having relative energy of 115 KeV have a fusion cross section up to 5 barns. The DT reaction produces a neutron of relatively low energy, i.e., 3.2 MeV. Neutron production may or may not be desirable, as will be discussed later.

The reaction represented by curve B where helium-3 and deuterium are employed is preferred. In that reaction a helium atom and a proton are produced plus 18.3 MeV of energy per reaction.

The cross section for the reaction between lithium and deuterium to produce two helium atoms is only partially shown and is not further available. However, it appears to be attractive, the reaction being:

$$^2D + ^6Li \rightarrow 2\,^4He + 22.4 \text{ MeV} \qquad (2)$$

Other modes of operation may prove to be equally or perhaps more desirable. For example, note the reaction between boron ions and protons from the curve H of FIG. 6.

It should be understood that the data shown in FIG. 6 comprises the cross sections for various reactions in a thermonuclear case, i.e., where particle velocity is randomly directed. It is to be understood in the present case where the motion is not random, but wherein particle velocities are in head-on collision courses, the cross section is significantly greater by an amount approximately equal to the square root of 6.

From the foregoing it is shown that nuclear particles are directed and controlled to produce head-on collisions in opposing beams of suitable positive ions. This is in contrast with the usual concept of plasma which is thermal, i.e., random, and includes undesirable electrons which radiate profusely, but are necessary for plasma neutralization.

Thermal plasma which is hard to contain and which is inefficient for energy release is avoided. Such inefficiency exists because only a small fraction of positive ions in the thermal plasma have the right conditions for fusion, namely, that part of Maxwellian distribution which has the right kinetic energy and relative direction.

In accordance with the present invention, two beams of selected positive ions move in a cylindrical path, traveling at the same radii and in opposite directions, hence optimal for head-on collisions.

A most important property of the focusing employed is that electron beam radii are stable. That is, any electron deviating from the sheath is automatically pulled back into the sheath. Thus, the electrons are forced into a thin sheet.

The energy conversion efficiency from heat to electricity or to mechanical energy can be as high as 45% to 50%. Thus, the ratio of reaction output to beam input energy may be the order of 61 to 1. The reaction:

$$^3He + ^2D \rightarrow ^4He + ^1p + 18.34 \qquad (3)$$

gives this ratio. In such case, about 40% to 45% of total fusion energy is recoverable.

It is known and can be shown that the stability condition for focusing a particle is given by the equation:

$$\frac{r_0^2 v_0^2}{r^3} - \frac{v_0^2}{r} = \frac{d^2 r}{dt^2} \qquad (4)$$

where:
  $r_0$ = the stable radius
  $v_0$ = particle velocity
  $r$ = the instantaneous radius cape to impinge the chamber wall. The energy is then absorbed by carbon liners in reaction chamber 29. Heat may then be extracted through use of heat exchangers encasing the walls of reaction chamber 29.

The electric fields applied in the compression and expansion zones, FIG. 1, are such as to force the electrons into a very thin, highly compressed, dense sheath which spirals at a very low pitch or grade.

FIG. 2

Figure 2:
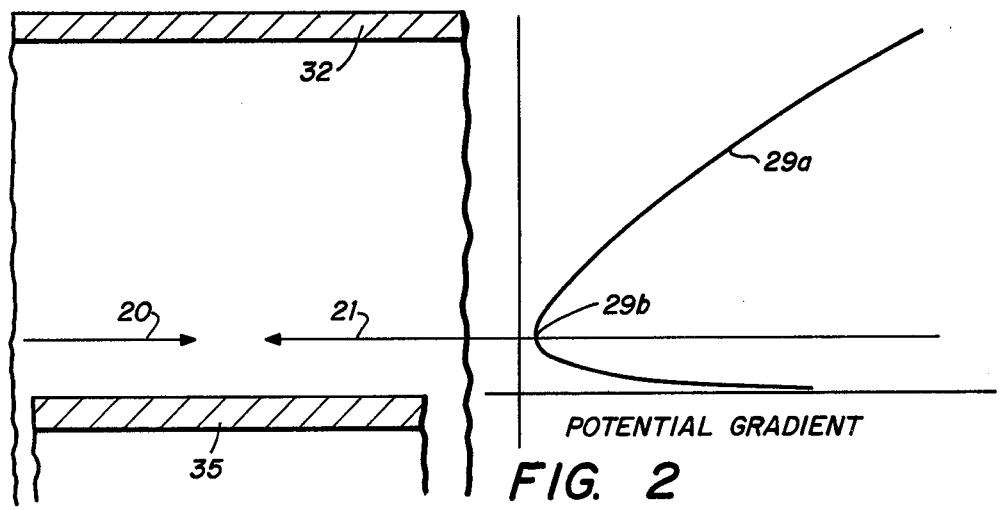
FIG. 2 is a graph illustrating the fields in the reaction zone.

Referring now to FIG. 2, a highly enlarged view of the reaction zone 29 has been shown. A portion of the wall of the housing 32 has been shown in its relation to the inner wall of the mandrel 35. The potential gradient in the reaction zone 29 is represented by the curve 29a having a minimum at point 29b. Because of this minimum, the ion beams 20 and 21 are forced to occupy a very thin cylindrical zone to enhance the likelihood of ion collisions.

It is to be understood that the entire system in which the electrons are generated, compressed and expanded is evacuated and that the fields in the compression zone and the expansion zone are so tailored as to cause the electrons to follow uniform spiral paths through the reaction zone 29. The electron paths shown in FIG. 1 have been shown as having a very coarse pitch. It is to be understood that this is solely for the purpose of illustration. In actual practice the pitch would be low so that in the reaction chamber 29 there would be a high concentration of electrons at any one time. A high incidence of head-on ion collisions is thus promoted.

The electric fields between the outer shell housing 31, 32, 33 and the various electrodes are tailored in the compression zone and the expansion zone to provide a gradual decrease and increase, respectively, in the diameter of the spiral path as the electrons travel from source 16 to exit port 17. More or fewer discrete compression fields may be imposed on the ion beam, the specific configuration depending upon particular design. An alternate embodiment shown in FIG. 3 employs two electron beams, one from each end of the system occupying slightly different radii so that a space charge potential minimum is created between the two beams. This provides a very strong focusing region for the positive ions to produce a nuclear reaction which is essentially free from electrons and is advantageous in reducing scattering and energy losses between the ion beams and the confining electrons.

The electron beams travel in opposite directions in the sense that electrons from source 16 travel from left to right whereas electrons from source 16a travel from right to left. As they so travel they follow spiral paths as the beams are comprised and then follow helical paths through the reaction zone 29. Thus, as the term spiral paths is used herein it is to be taken to include the truly helical portions of the paths in reaction zone 29.

Where the radial magnetic fields in gaps 11 and 13 are the same (i.e., both directed radially inward from north to south poles) the direction in which the electrons from source 16 follow the spiral paths will be opposite the direction the electrons from source 16a follow their paths. In such case, if the radii of the two beams were the same, then the electrons would travel such as to experience head-on collisions. However, if the magnetic field 11 is opposite in sense from the magnetic field 13, then electrons from sources 16 and 16a would travel spiral paths in the same general direction, as the electron moves from left to right from source 16 and from right to left from source 16a.

The following paths through reaction zone 29 at slightly different radii, the space charge potential is minimum between the two beams. It is at this location of minimum space charge potential that the ions then tend to settle into paths at the common radius, and thus in paths that tend to promote head-on collisions.

The dual electron beam system or the single electron beam system in which the ions and the electrons occupy the same space may serve in carrying out this invention.

FIGS. 3-5

A dual electron-dual ion beam reactor is illustrated in FIGS. 3-5. A hollow annular magnetic ring 10 of rectangular cross section has circumferential gap 11 in one face thereof. Similarly, a second hollow annular ring 12 is provided with gap 13. Rings 10 and 12 are spaced apart on a common axis with the gaps 11 and 13 facing each other. Ring 10 is provided with an electrical winding 14. Ring 12 is provided with an electrical winding 15. Controllable currents in windings 14 and 15 produce magnetic fields across gaps 11 and 13 to force the electrons to follow spiral paths for introduction into the electric field confinement space with desired angular momentum.

Electron generator-accelerator source 16 is provided inside ring 10. Electron generator-accelerator source 16a is provided inside ring 12. Source 16 may comprise a plurality of electron beam sources at angularly spaced positions around the circumference of ring 10. A like number of sources angularly spaced around the interior of ring 12 may be used. In such case, many individual beams are accelerated through gaps 11 and 13, respectively. Magnetic fields across gaps 11 and 13 will cause the electrons to be deflected and forced into spiral paths as they move away from gaps 11 and 13. As above explained, electric fields are imposed on each electron to force the spiraling electron sheaths to follow paths of progressively decreasing diameter. As the diameter decreases, the electron density increases. The two oppositely traveling high density beams of electrons will have slightly different velocities as to pass through a cylindrical reaction zone at slightly different radii.

The structure between rings 10 and 12 forms compression zone adjacent ring 10, compression zone adjacent ring 12, and central reaction zone.

An outer housing is provided with cylindrical section housing 30, conical section housing 31, cylindrical section housing 32, a conical section housing 33, and cylindrical section housing 34. Sections housing 30–34 as shown are integral one with another with the central section housing 32 being cylindrical.

Mandrel 35 extends coaxially of the compression zones and the reaction zone. A closure plate 36 is secured between ring 10 and the end of mandrel 35. Similarly, an end closure plate 37 is secured between ring 12 and the end of mandrel 35. With such closure plates, the space inside the housing 30–34 and outside the central cylinder 35 can be evacuated as by vacuum pumps 38. Electrodes 40–45 are symmetrical to the axis 35a of the system. Electrode 40 is generally cylindrical in shape. The end of electrode 40 opposite ring 10 is slightly conical. Electrode 41 is of conical shape with an internal angle less than the angle of the conical section housing 31. Electrode 42 in the form of a truncated cone is connected to mandrel 35 at the entrance to the cylindrical reaction zone housing 32 and extends to- If a particle deviates in either direction from the stable radius $r_0$ for velocity $v_0$, the particle is pulled back to the stable orbit $r_0$.

The small oscillations die down by means of dissipative currents at the walls and in the pyrolytic carbon coating. Thus, stable and extremely dense beams of particles are produced.

As above noted, the electron beams thickness can be very small and particle density can be made very large by means of independently controlling the electron sources.

It is to be noted that space charge does not lead to beam spreading because as focused the wall develops a charge density:

$$q = -e\phi^2\epsilon_0/2\pi r_a^2 \qquad (5)$$

and, thus, overall beam spread due to space charge is prevented. The space charge effect is compensated by q. The only remaining particle deviations from the beam are due to the coulomb scattering of individual particles due to the granular nature of the charges. Under these conditions the charge density $\rho$ for negative electrons is given by the equation:

$$\rho = -\frac{ZeE_0\phi^2}{2\pi^2 Mr^4} \qquad (6)$$

where:
Z is the charge-number of the negative electrons;
$\phi$ is the magnetic flux which originally guides the electrons into the circular Harris orbit;
M is the mass of the electron; and
r is the radius of the orbit.

Charge density, and thus electron density, depend upon the inverse of $r^4$. This density increases by a large factor by starting with a large radius and then compressing the beam to a small radius. The compression is achieved by bending the ion beam, which is originally obtained via a steady electric field. The radial magnetic field is the term $\phi$ in equation (6). The beam is fed into the small stable radius in zone 29, FIG. 1, as controlled by electrostatic focusing. Since $e\phi^2/Mr^4$ can be very large, the electron density can be made very large. The ratio of the total number of electrons forming the sheath to the total number of ions in the sheath is at least equal to the ratio of the average ion mass to the mass of the electron whereby said ions respond to the electric fields in the sheath to settle into paths at a radius in the sheath at which the potential gradient is minimum.

In obtaining beams of high density electrons an operation related to what is known as Harris focusing is employed. Harris focusing is of the type described in W. W. Harmon, *Fundamentals of Electronic Motion*, McGraw-Hill Book Company, Inc., 1953, pages 161 and 162.

Having described the invention in connection with certain specific embodiments thereof, it is to be understood that further modifications may now suggest themselves to those skilled in the art and it is intended to cover such modifications as fall within the scope of the appended claims.

I claim:

1. In a fusion reactor, the combination comprising:
   (a) means including coaxial electrodes spaced apart to establish an annular reaction zone with a voltage thereacross to establish a spiral beam of electrons traveling along a common spiral path through an annular reaction zone free from any applied magnetic field to form a cylindrical electron sheath which rotates as a whole about a common sheath axis; and
   (b) means to project oppositely directed beams of fusible ions longitudinally through said electron sheath to force ions in both ion beams into linear paths in a common thin cylindrical zone located where the potential gradient in electron sheath is minimum.

2. A system for promotion of nuclear fusion comprising:
   (a) means including coaxial electrodes spaced apart with a voltage thereacross to establish an annular reaction zone free from any applied magnetic field with means to maintain a beam of flowing electrons as a cylindrical spiral electron sheath which rotates as a whole about a common sheath axis having a transverse electron distribution such that the potential gradient across said sheath exhibits a minimum within said sheath; and
   (b) ion sources for projecting oppositely directed beams of fusible ions through said electron sheath to force the ions in both beams to follow paths where the potential gradient in electron sheath is minimum.

3. The combination set forth in claim 2 wherein said sheath is cylindrical wherein said electrons flow in spiral paths.

4. The combination set forth in claim 3 wherein said ions travel in opposite directions along linear paths substantially perpendicular to the direction of travel of said electrons.

5. A system for promotion of nuclear fusion comprising:
   (a) electrode structure forming boundaries for an annular cylindrical chamber with a voltage thereacross;
   (b) means to establish and maintain spiral beam of electrons in said chamber in the form of a cylindrical electron sheath which rotates as a whole about a common sheath axis free from any applied magnetic field; and
   (c) means to project oppositely directed beams of fusible ions through said electron sheath in said chamber to force said ions into linear paths where the potential gradient in electron sheath is minimum for enhancing head-on collisions between ions in said oppositely directed beams.

6. A method for promoting fusion of atomic particles which comprises:
   (a) establishing an annular reaction zone bounded by coaxial cylindrical walls with a voltage thereacross;
   (b) accelerating and focusing a stream of electrons for spiral flow to form a cylindrical electron sheath which rotates as a whole about a common sheath axis free from any applied magnetic field;
   (c) projecting high energy ions from a first source along through said sheath in a first direction;
   (d) projecting high energy ions from a second source through said sheath in direction opposite to said first direction wherein ions from both sources respond to the electric fields in said sheath to settle into paths at the radius at which the potential gradient in said sheath is minimum.

7. The method of claim 6 wherein said electrons emerge from a circular source symmetrical to an axis common to said sheath and wherein said electrons are magnetically deflected and electrostatically focused into spiral paths to form said sheath.

8. The method of claim 6 wherein the ratio of the total number of electrons forming said sheath bears a predetermined relation to the ratio of the mass of the electron to the average mass of the ions in said sheath.

9. A method of claim 6 wherein the ratio of the total number of electrons forming said sheath to the total number of ions in said sheath is at least equal to the ratio of the average ion mass to the mass of the electron.

10. A method for promoting fusion of atomic particles which comprises:
   (a) establishing a spiral flow of electrons to form a cylindrical electron sheath in an annulus between a pair of coaxial electrodes across which a voltage is applied and which flow rotates as a whole about a common sheath axis free from any applied magnetic field;
   (b) projecting high energy ions from a first source through said sheath in a first direction;
   (c) projecting high energy ions from a second source through said sheath in direction opposite to said first direction;
   (d) the ratio of the total number of electrons forming said sheath to the total number of ions in said sheath being at least equal to the ratio of the average ion mass to the mass of the electron whereby said ions respond to the electric fields in said sheath to settle into paths at a radius in said sheath at which the potential gradient is minimum.

11. In a fusion reactor, the combination comprising:
   (a) means including coaxial electrodes spaced apart with a voltage connected between said electrodes to establish an annular reaction zone with means to establish spiral flow of electrons along paths whose locus is a cylinder thereby forming an electron sheath which rotates as a whole about a common sheath axis free from any applied magnetic field; and
   (b) means to project oppositely directed beams of fusible ions along substantially linear paths parallel to the length of said cylinder and through said spiral flow to force the ions in both beams into a common thin cylindrical path located where the potential gradient due to said electron flow is minimum.

12. The system according to claim 11 in which the first means establishes spiral flow of electrons is in our direction only.

13. The system according to claim 11 in which the first means establishes spiral flow of electrons in two directions.

14. The system according to claim 13 in which the first means establishes electron flow in one direction at a first radius and in the opposite direction in a second radius slightly different from the first radius.

15. A system for promotion of nuclear fusion comprising:
   (a) means including coaxial electrodes spaced apart with a voltage connected between said electrodes to establish an annular reaction zone with means to maintain a spiral flow of electrons to form a cylindrical electron sheath which rotates as a whole about a common sheath axis having radial electron distribution such that the potential gradient across said sheath exhibits a minimum free from any applied magnetic field; and
   (b) ion sources for projecting oppositely directed beams of fusible ions along paths whose locus is a cylinder and which paths pass through said electron sheath to force the ions in both beams to follow paths where the potential gradient in electron sheath is minimum.

16. The system of claim 15 in which the means to maintain said spiral flow comprises two sources of electrons, one adjacent to each of said ion sources, and wherein electrons from one of said sources are of velocity different from the velocity of electrons from the other source.

* * * * *

UNITED STATES PATENT AND TRADEMARK OFFICE
CERTIFICATE OF CORRECTION

PATENT NO. : 4,434,130
DATED : February 28, 1984
INVENTOR(S) : Winfield W. Salisbury It is certified that error appears in the above—identified patent and that said Letters Patent is hereby corrected as shown below:

Column 4, line 31 "now" should be --not--.

Column 6, line 3, delete "The" and insert --By the electrons-- therefor.

Column 6, line 52, after "section" first occurrence delete --housing--.

Column 6, line 52, delete "Sections" second occurrence.

Column 6, line 52, change "housing" to --Housing--.

Column 6, line 69, delete "reaction zone".

Column 7, line 9, delete "section".

Column 7, line 15, delete "section".

Signed and Sealed this

Twenty-ninth Day of May 1984

[SEAL]

Attest:

GERALD J. MOSSINGHOFF

Attesting Officer

Commissioner of Patents and Trademarks